United States Patent [19]

Saxton

[11] 4,025,431
[45] May 24, 1977

[54] APPARATUS FOR CLEANING AND AERATING WATER WITHIN AN AQUARIUM TANK

[75] Inventor: Peter V. Saxton, Indianapolis, Ind.

[73] Assignee: Indianapolis Center for Advanced Research, Inc., Indianapolis, Ind.

[22] Filed: Sept. 22, 1975

[21] Appl. No.: 615,777

[52] U.S. Cl. .................................. 210/108; 210/169
[51] Int. Cl.² ......................................... B01D 23/24
[58] Field of Search ............ 210/82, 169, 220, 108; 61/.5, 1 R; 15/1.7

[56] References Cited

UNITED STATES PATENTS

| | | |
|---|---|---|
| 3,333,701 | 8/1967 | Scafuro .............................. 210/169 |
| 3,452,966 | 7/1969 | Smolski .............................. 210/220 |
| 3,746,168 | 7/1973 | Willinger et al. .............. 210/169 X |
| 3,795,225 | 3/1974 | Ogui ................................ 210/169 X |
| 3,814,254 | 6/1974 | Schatz ................................ 210/169 |
| 3,827,560 | 8/1974 | Morton .............................. 210/169 |
| 3,835,813 | 9/1974 | Katz .................................. 210/169 |

Primary Examiner—Theodore A. Granger
Attorney, Agent, or Firm—Woodard, Weikart, Emhardt & Naughton

[57] ABSTRACT

A filter for an aquarium tank and apparatus for cleaning and aerating water within the tank. A pair of spaced apart but perforated walls are located above and spaced from the bottom wall of the tank forming an enclosure. Filter material is located between the perforated walls. A cylindrical housing extends through the perforated walls having a closed but perforated top end and an open bottom end opening into the enclosure. An upstanding tube extends through the housing having an open top end. Pressurized air is directed into the upstanding tube. A tube extends into the upstanding tube allowing water within the tank to flow into the upstanding tube. The air and water then flow upwardly through the tube and through the housing with the air escaping from the housing. The water then flows downwardly between the housing and tube and eventually upward through the filter material. Means are provided for reversing the water flow for cleaning of the filter.

6 Claims, 6 Drawing Figures

4,025,431

APPARATUS FOR CLEANING AND AERATING WATER WITHIN AN AQUARIUM TANK

BACKGROUND OF THE INVENTION

1. Field of the Invention

This invention is in the field of water filters and more specifically, filters for aquarium tanks.

2. Description of the Prior Art

A number of prior art devices have been provided for filtering and aerating water within an aquarium tank. The traditional method of aerating water within a tank is to force a stream of air through the water whereas the water is removed from the tank for filtering by an external device. In the U.S. Pat. No. 3,738,491 issued to D. J. Dockery, the gravel at the bottom of the aquarium tank is used to trap waste material and debris so that it can be eliminated by natural decay or by backwashing of the gravel. Another U.S. Pat. No. 3,516,544 issued to W. Sesholtz discloses an aquarium filter having a perforated filter positioned at the bottom of the tank. The more traditional external filter is disclosed in the U.S. Pat. No. 3,554,375 issued to A. H. Willinger whereas U.S. Pat. No. 3,759,223 issued to R. A. D'Andrea discloses a filter located at the bottom of the tank with the water being drawn from the bottom of the tank through the filter. A more complex filter is disclosed in U.S. Pat. No. 3,774,766 issued to H. E. Brock which has a plurality of compartments through which the water flows. Another multiple compartment device is disclosed in U.S. Pat. No. 3,247,826 issued to R. G. Girard.

SUMMARY OF THE INVENTION

One embodiment of the present invention is a filter for an aquarium tank comprising wall structure means positionable within the tank and having at least a portion thereof spaced apart from the tank defining an enclosure and further forming a chamber opening into the enclosure, filter material means mounted to the structure and operable to cleanse water flowing in a first direction from the enclosure through the material means, entrance means opening into the chamber operable to allow water within the tank to flow into the chamber, air means opening into the chamber operable to direct pressurized air into the chamber to force water through the entrance means and in a first direction through the material means and, backwash means extending from exteriorly of the tank into the enclosure being operable to withdraw water from the tank through the filter material means reverse to the first direction cleaning the filter material means and removing all collected sediments in the enclosure.

A further embodiment of the present invention is a method of filtering water in an aquarium tank comprising the steps of positioning a filter in water in an aquarium tank, forcing air into the water, directing the air to force some of the water along a tortuous path to mix the air and water together, allowing the air to escape the water, directing the water from the tortuous path through the filter in a first direction cleansing the water.

It is an object of the present invention to provide a new and improved aquarium tank filter.

Related objects and advantages of the present invention are apparent from the following description.

DESCRIPTION OF THE PREFERRED EMBODIMENTS

Figure 1:
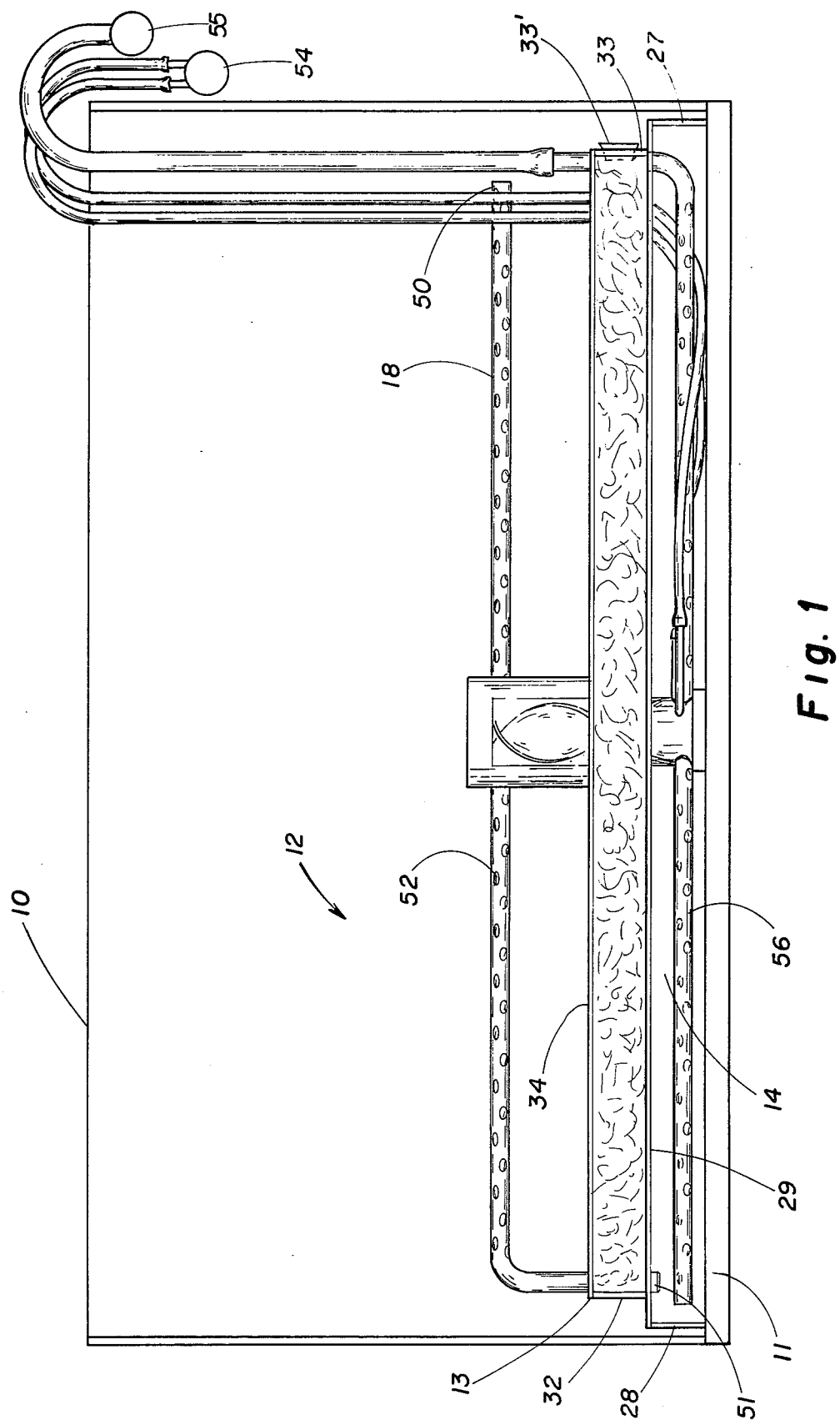
FIG. 1 is a side view of an aquarium tank incorporating an alternate embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
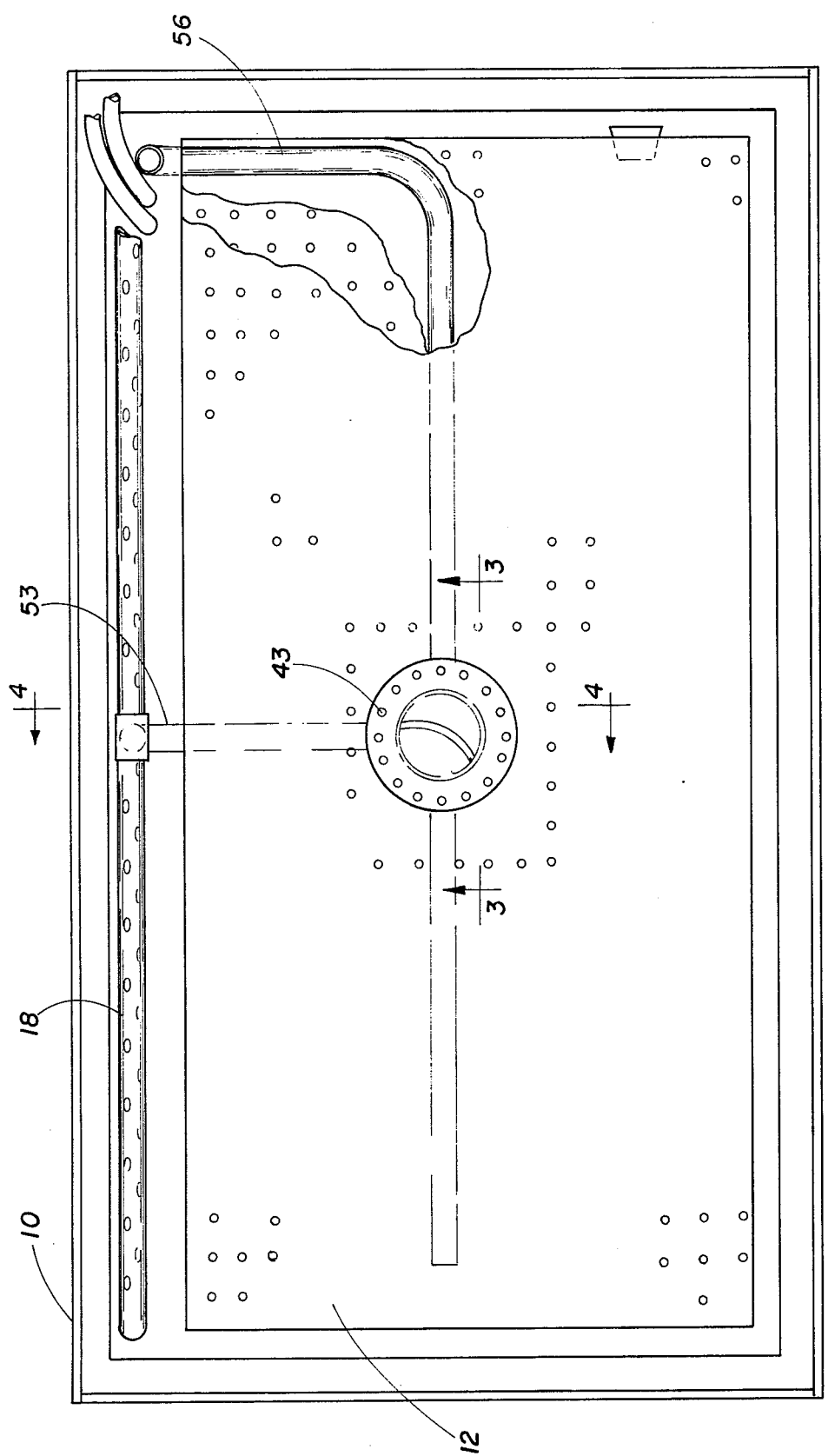
FIG. 2 is a fragmentary top view of the aquarium tank in FIG. 1.

Referring now more particularly of FIGS. 1 and 2, there is shown an alternate embodiment of the filter in an aquarium tank 10. Mounted atop bottom wall 11 of aquarium tank 10 is filter 12 for cleaning and aerating the water within the tank. In addition, the filter is provided with means for automatically cleaning the filtering material and removing collected sediment at periodic intervals.

Filter 12 includes a wall structure 13 which is positioned within the tank atop bottom wall 11. A portion of the wall structure is spaced apart from the bottom wall of the tank defining an enclosure 14 (FIG. 3) and further forming a chamber 15 opening into enclosure 14. Filter material 16 is enclosed between wall structures 34, 30, 29, and 21 and is used to cleanse the water flowing through the filter material in the direction of arrow 17. An upstanding tube 36 (FIG. 3) is provided with one end opening into chamber 15. A perforated tube 18 is mounted atop wall structure 13 (FIG 2) and leads into upstanding tube 36 thereby providing entrance means to allow the water within the tank to flow into chamber 15 via tube 36.

A pair of conduits 19 and 20 (FIG 3) are connected to a source of pressurized air and open into chamber 15 via tube 36 adjacent of opening 21 of perforated tube 18. As a result, as air is forced in the direction of arrows 22, the water within perforated tube 18 flows through opening 21 and upwardly in the direction of arrows 23 so as to flow through tube 36 and eventually down through chamber 15 to enclosure 14 dropping some sediment and thence upwardly through filter material 16 in the direction of arrow 17. Conduits 19 and 20 thereby provide air means operable to direct pressurized air into chamber 15 and tube 36 so as to carry water through tube 36.

Another perforated tube 56 is mounted to wall structure 13 and extends from exteriorly of the tank into enclosure 14 providing a backwash means connected to a suction pump or siphon operable to withdraw water from tank 10 through the filter material 16 in a direction 24 (FIG 3) reverse to direction 17 so as to clean the filter material and to remove collected sediment from enclosure 14.

Wall structure 13 includes an intermediate wall 29 integrally joined to walls 25 through 28 forming enclosure 14 having an open bottom positioned adjacent the bottom wall 11 of the aquarium tank. A second pair of end walls 30 and 31, along with a second pair of side walls 32 and 33, are integrally mounted atop intermediate wall 29 and are integrally connected to a top wall 34. Walls 29 and 34 are perforated within the bounds of walls 30-34 and are spaced apart forming space in which filter material 16 is positioned. Walls 29 and 34 are spaced apart from the bottom wall 11 of the tank with enclosure 14 being located between wall 11 and intermediate wall 29. Wall 33 is provided with an aperture sealingly closed by plug 33' which may be removed for insertion or removal of filter material 16.

Wall structure 13 further includes a cylindrical housing 35 attached to and extending through walls 29 and 34. An upstanding tube 36 extend through housing 35 forming a chamber 15 therebetween. Housing 35 has an open bottom end opening into enclosure 14 and a closed but perforated end 37 positioned outwardly of walls 29 and 34.

Tube 36 has an open top 38 positioned by but spaced from the top end 37 of housing 35. The bottom end of tube 36 is provided with a flange 39 allowing tube 36 to stand upright atop bottom wall 11 of the aquarium tank. A winding wall 40 extends through tube 36 providing two winding paths as shown by arrows 41 and 42 for the air exiting conduits 19 and 20 and the water exiting through opening 21 to follow thereby mixing the water and air within tube 36. The air entering tube 36 from conduits 19 and 20 provide a suction effect thereby sucking the water through opening 21 carrying the water upwardly through the tube. Eventually, the water and air will flow through the top end 38 of tube 36 with the air eventually escaping housing 35 through a plurality of apertures 43 which are arranged in a circle extending around the top end 37 of the housing. The water then flows downwardly in the direction of arrows 48 between tube 36 and housing 35. The water flowing from housing 35 then flows into enclosure 14 releasing some of the sediment and then upwardly through the filter material in the direction of arrows 17 depositing all remaining sediment in the filter material. As previously mentioned, walls 29 and 34 are perforated allowing the water to move therethrough.

Figure 4:
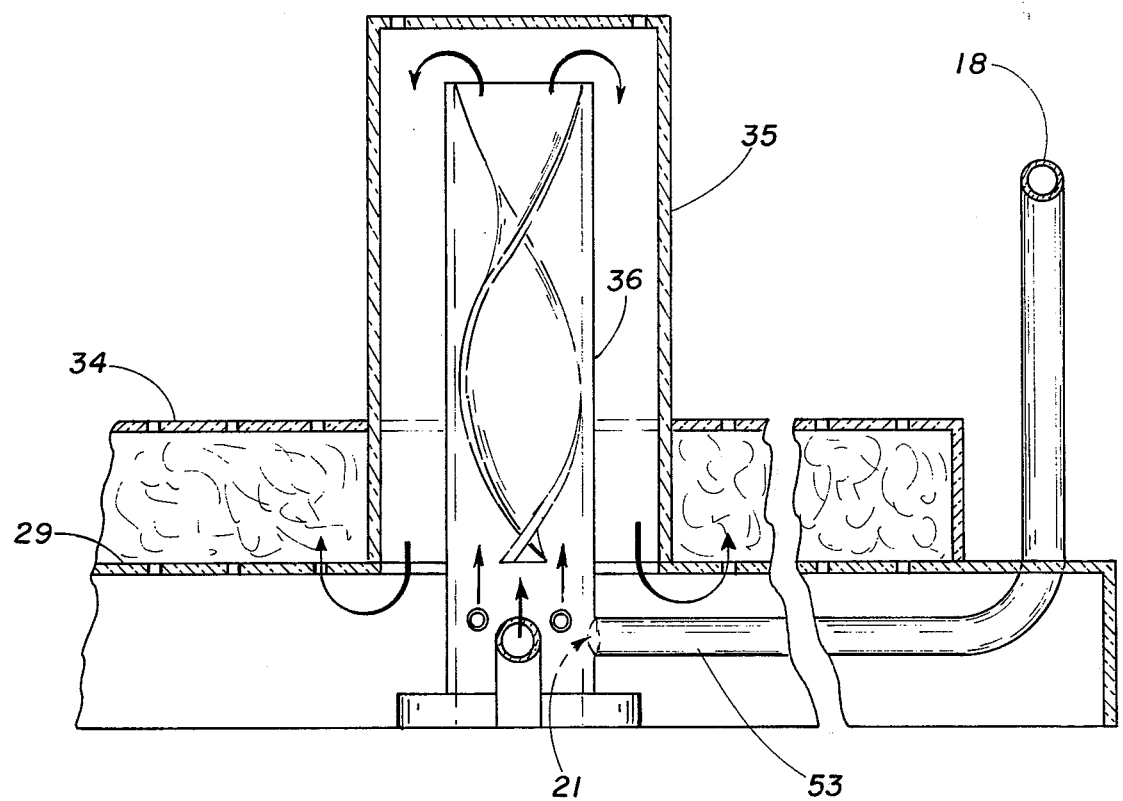
FIG. 4 is an enlarged cross-sectional fragmentary view taken along the line 4—4 of FIG. 2 and viewed in the direction of the arrows.

Perforated tube 18 has a first closed end 50 (FIG 1) with the opposite end 51 also being closed and mounted to intermediate wall 29 (FIG 1). A plurality of apertures 52 are provided on tube 18 to allow the water within the aquarium tank to enter into the tube. Intermediate the opposite end of tube 18 is a tube 53 branching off of tube 18 and extending into upstanding tube 36 (FIG 4) via opening 21. Water within perforated tube 18 flows into tube 53 and then into tube 36.

A method of filtering the water in the tank includes the step of first positioning the filter in the water within the aquarium tank. Gravel may then be placed atop walls 29 and 34 so as to conceal the walls while allowing water to pass therethrough. Housing 35 extends upwardly through the gravel. Air is then forced into the water via conduits 19 and 20 which are connected to a source of pressurized air 54 (FIG 1). The pressurized air is directed into tube 36 adjacent opening 21 to force some of the water along a tortuous path formed by winding member 40. The water is mixed with the air as it flows along the tortuous path. The air is then allowed to escape into the remaining water by passing through apertures 43 and eventually escapes through the top surface of the water. This process serves to continually aerate and circulate the aquarium water. After the water leaves tube 36, it is directed downwardly in the direction of arrows 48 and then upwardly in the direction of arrow 17 (FIG 3) through the filter thereby cleansing the water.

Whenever it is desired to clean the filter and enclosure 14, it is unnecessary to remove the filter from the tank. Pump or siphon 55 is activated thereby forcing some of the water within the tank in the direction of arrow 24 and further forcing the dirt and other accumulated material into enclosure 14 and eventually into perforated tube 56 being withdrawn by pump 55. Tube 56 in conjunction with pump 55 provide a backwash means for periodic cleaning of the filter and enclosure 14.

Many variations in the present invention are contemplated and included herein. For example, walls 29 and 34 are shown horizontal although the filter is operable even though the walls are not horizontal. Likewise, walls 29 and 34 have been described as perforated walls although it is to be understood that a pair of screens may be substituted for walls 29 and 34 so as to hold filter material 16.

Many advantages of the present invention will be obvious from the above description. For example, the present filter achieves superior filtering and in addition, circulates the water in a more efficient fashion as compared to the prior art devices. Superior filtering is achieved since the filtering material is not and cannot be disturbed being completely enclosed by perforated walls 29 and 34. The filter material is exposed over the maximum surface area since the filter utilizes all or practicaly all of the area of the bottom of the aquarium. Much of the sediment collected from the aquarium settles out before it reaches the filter material thereby extending the effective life of the filter material. The backwash tube extends along the entire width of the tank thereby efficiently removing all dirt and sediment from the water. Superior water circulation is achieved since the perforated walls 29 and 34, while sufficient to hold the filter medium, allow freer flow of water through the filter than prior art box filters. A greater quantity of water is circulated because of the large cross-sectional area of the housing and because the winding member extending through the upstanding tube provides a pair of helical paths causing the air and water to contact over a longer distance as the air and water travel upwardly around the helically wound member. The air is allowed to escape from the housing further increasing the pump efficiency, providing a more random mixture of air and water and reducing the tendency for some of the water to allow passage of an air bubble without being upwardly moved.

Excellent aeration of the water within the tank is accomplished since the air is released through the perforated top end of the housing in a position normally deep in the water. The filtering device has an exceptionally good appearance since the main body of the filtering device is located beneath the gravel with the remaining portion being produced of translucent plastic. Likewise, a circular pattern of small bubbles is released on the perforated top end of the housing providing an aesthetic pattern. The subject filtering device is particularly advantageous as compared to the prior art devices in that the device uses activated charcoal as a filtering medium and provides for the first time an under-gravel filter whose filter medium cannot be disturbed by fish digging through the gravel. There are classes of experienced aquarists who will use nothing but activated charcoal for filtering and also who will not use the under-gravel filters because of the prior art devices not providing for an undisturbed filter medium. This system provides for both of these schools of thought plus being attractive to all less-experience aquarium owners as it requires minimum maintenance and minimum technical skill to set up for operation.

As previously described, perforated top end of the housing allows the air to escape from the housing whereas the water is forced downwardly between the housing and upstanding tube. In one embodiment, the diameter of each aperture in the perforated top end of the housing was approximately 1/64 of an inch.

Figure 5:
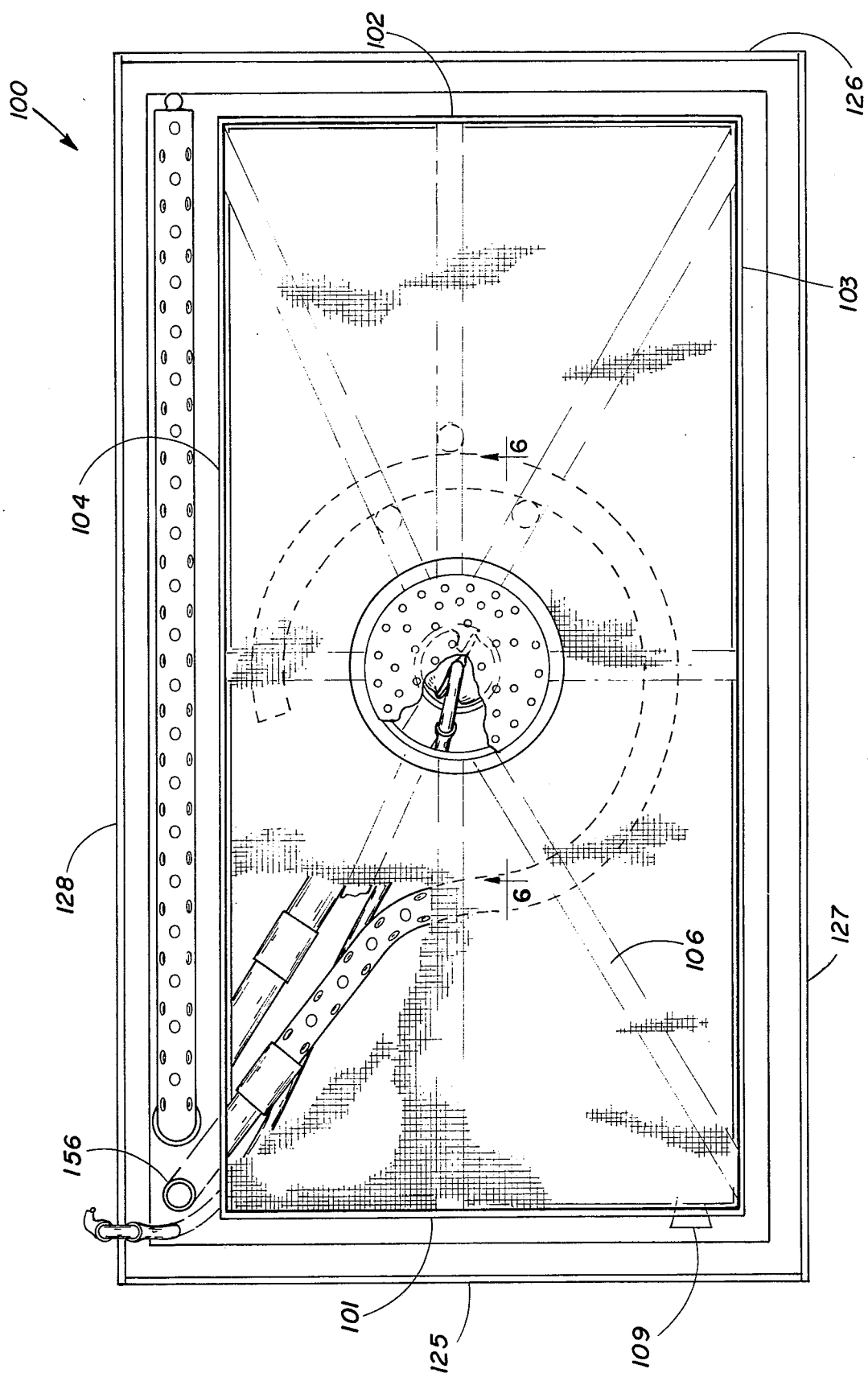
FIG. 5 is a fragmentary top view of an aquarium filter incorporating the preferred embodiment of the present invention.
Figure 6:
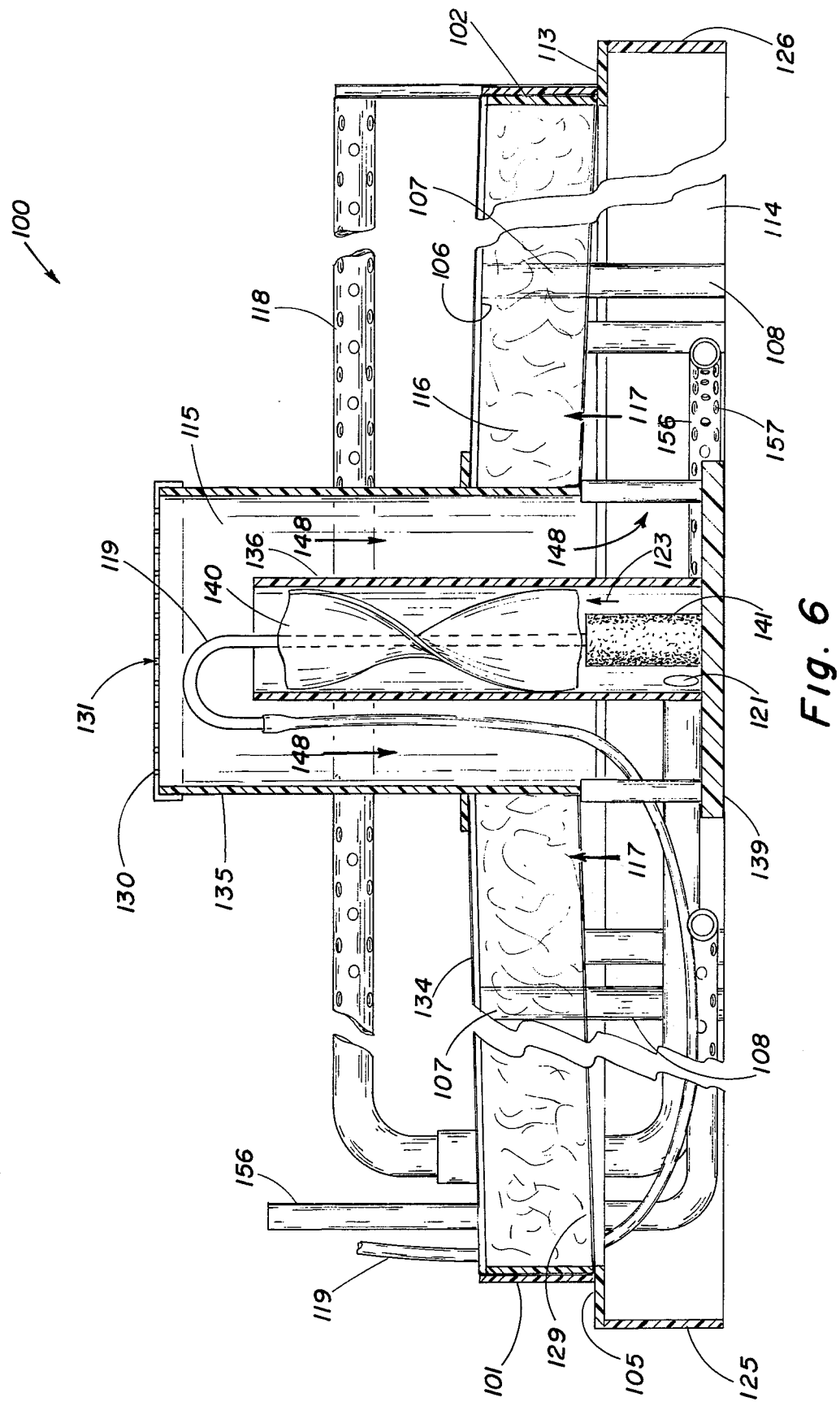
FIG. 6 is an enlarged cross-sectional fragmentary view taken along the line 6—6 of FIG. 5 and viewed in the direction of the arrows.

Referring now more particularly to FIGS. 5 and 6, there is shown the preferred embodiment of the aquarium filter incorporating the present invention. Filter 100 is mounted atop the bottom wall of the aquarium tank for cleaning and aerating the water within the tank. Filter 100 is also provided with means for automatically cleaning the filtering material and removing collected sediment at periodic intervals.

Figure 3:
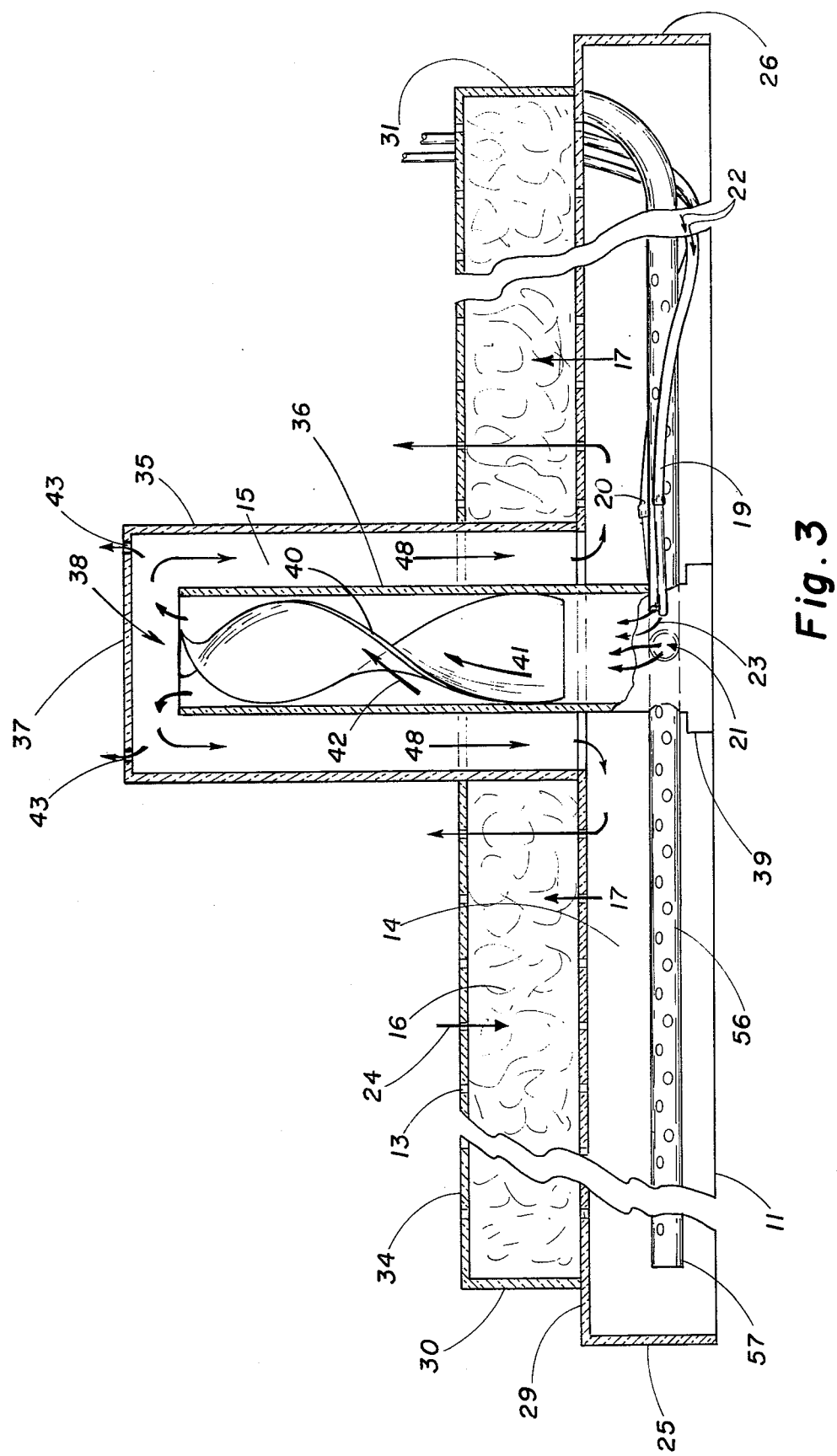
FIG. 3 is an enlarged cross-sectional fragmentary view taken along the line 3—3 of FIG. 2 and viewed in the direction of the arrows.

Filter 100 is identical to the filter shown in FIG. 3 with the exception that the horizontal walls forming the enclosure for holding the filter material are produced from screen material. In addition, filter 100 includes only a single air input line which extends downwardly through the helix provided in the upstanding tube. An air stone is connected to the distal end of the air input line with the stone located beneath the helical member allowing the air and water to flow upwardly around the helical member. In addition, filter 100 includes a removable top wall extending across the housing extending around the upstanding tube facilitating removal of the helical member and air stone. The perforated tube extending beneath the filtering material partially encircles the upstanding tube in order to increase the efficiency of sediment removal.

Filter 100 includes a structure 113 which defines an enclosure 14 and a chamber 115 opening into enclosure 114. Filter material 116, identical to filter material 16 previously described, is enclosed within screens 134 and 129 and wall structures 101 and 102 and is used to cleanse the water flowing through the filter material in the direction of arrows 117. Perforated tube 118 is mounted atop structure 113 and leads into chamber 115 thereby providing an entrance means to allow the water within the tank to flow into tube 136. A single air conduit 119 is connected to a source of pressurized air and extends into chamber 115 and then downwardly through the top end through upstanding tube 136. Tube 136 is fixedly mounted atop base 139 resting upon the bottom wall of the aquarium tank. Perforated tube 118 extends downwardly into enclosure 114 and then opes via apertures 121 into tube 136.

Air conduit 119 extends downwardly through helically would member 140 with tube 119 connected to and opening into an air stone 141 positioned at the bottom of upstanding tube 136 adjacent entrance 121 of tube 118. As air is forced through tube 119 into air stone 141, the water within peforated tube 118 flows through opening 121 and upwardly in the direction of arrow 123 along with air exiting from stone 141. Eventually, the water and air will flow out of the top end of upstanding tube 136. The air will continue to flow upwardly through a perforated top wall 130 removably mounted to housing 135. Top wall 130 is provided with apertures 131 allowing the air to escape from housing 135. The water and sediment exiting upstanding tube 136 will flow downwardly in the direction of arrows 148 and into enclosure 114. The water will then flow through screen 129, filter material 116 and screen 134 in the direction of arrows 117.

A sediment removal tube 156 is mounted to structure 113 and extends from exteriorly of the tank into enclosure 114 providing a backwash means connectable to a siphon and operable to withdraw water from the aquarium tank through the filter material 116 in the direction opposite of arrows 117. Tube 156 is provided with a plurality of apertures 157 to allow the sediment within enclosure 114 to enter tube 156. Tube 156 partially encircles upstanding tube 136 and is positioned adjacent the tube to increase the efficiency of sediment removal since most of the sediment exiting housing 135 falls in the general vicinity of the center of the aquarium around tube 136.

Wall structure 113 includes two vertical end walls 125 and 126 joined to two vertical side walls 127 and 128. Walls 125-128 along with screen 129 form the enclosure 114. A second pair of end walls 101 and 102 are joined to a second pair of side walls 103 and 104 forming the enclosure for holding filter material 116. Intermediate horizontal wall 105 is fixedly mounted atop walls 125–128 with walls 101–104 being mounted across intermediate wall 105. Screens 129 and 134 extend between walls 101-104 with housing 135 projecting upwardly through screens 129 and 134. Thus, water may flow freely in the direction of arrows 117 through the filtering material.

A plurality of strengthening ribs 106 are attached to vertical walls 101–104 and extend immediately beneath the top screen 134 providing a slight upward bias of screen 134 from walls 101–104 to housing 135. In addition, screen 129 is biased upwardly from walls 101–104 to housing 135. The upward bias of the screen 129 allows any gas formed beneath the screen to flow toward the center of the filter and then outwardly from the filter. A plurality of spacers 107 are attached to the bottom surface of strengthening ribs 106 and to the top surface of bottom screen 129 thereby spacing screens 129 and 134 apart the desired distance. In addition, a plurality of additional spacers 108 are attached to the bottom surface of screen 129 immediately beneath spacers 107. Spacers 108 rest atop the bottom wall of the aquarium tank thereby supporting screen 129 upwardly therefrom. In addition, spacers 108 are positioned adjacent perforated tube 156 preventing movement of the perforated tube. Gas is prevented from accumulating beneath screen 129 as a result of the upward bias of screen 129. In the event gas would be allowed to accumulate beneath screen 129 then water would not flow through filter 116 immediately above the accumulated gas. Thus, the upward bias of the screen provides a more efficient filter. Wall 101 is provided with an aperture sealingly closed by plug 109 which may be removed for insertion or removal of filter material 16. Housing 135 extends through screens 129 and 134 and is provided with an open bottom end opening into enclosure 114.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A filter for an aquarium tank comprising:

an enclosure constructed and arranged to be located at the bottom of an aquarium tank;

filter material means located along the upper portion of said enclosure and spaced above the bottom thereof;

an upstanding tube having a closed bottom and sidewalls, said tube having an open top, said tube being supported by said enclosure and extending upwardly above a top portion of said enclosure;

a chamber having a perforated top and further having sidewalls extending peripherally about the sidewalls of said tube and spaced apart therefrom, the sidewalls of said chamber extending upwardly above the open top of said tube, the lower edge of the sidewalls of said chamber being spaced above the bottom of said enclosure to provide fluid communication between the space between said tube and said chamber and the underside of said filter material means;

a conduit having an inlet opening located exteriorly of said enclosure, tube and chamber and an outlet opening in fluid communication with the lower portion of said tube; and air lift means located in the lower portion of said tube for introducing air into said tube, whereby water drawn from exteriorly of said enclosure, tube and chamber by said air lift means is caused to flow upwardly in said tube, downwardly through the space between said tube and said chamber to said enclosure and upwardly through said filter material means.

2. The filter of claim 1 and which further inclues:

backwash means for causing water to flow downwardly through said filter material means into said enclosure and from said enclosure to a location exterior of the tank, said backwash means including a conduit having an inlet opening in fluid communication with the interior of said enclosure and an outlet opening located exteriorly of the tank.

3. The filter of claim 2 wherein:

said backwash means includes a perforated tube extending through said enclosure and said upstanding tube and then outwardly of said tank.

4. The filter of claim 2 wherein:

said spaced apart walls are horizontal;

said backwash means includes a pump connected to said perforated tube; and said air lift means includes a conduit opening into said tube and a source of pressurized air connected to said conduit.

5. The filter of claim 1 wherein:

said enclosure includes a pair of spaced apart perforated walls between which is located said filter material means, one of the walls forming the top of said enclosure, the other of the walls being spaced upwardly apart from the top of said enclosure.

6. The filter of claim 1 and which further includes a winding member extending through said upstanding tube providing a winding path for said air and said water from said air lift means and said conduit.

* * * * *